United States Patent
Philippoz et al.

(10) Patent No.: US 6,312,824 B1
(45) Date of Patent: Nov. 6, 2001

(54) COPOLYESTER ELASTOMER COMPOSITIONS AND FUSION BONDED ARTICLES

(75) Inventors: Jean-Michel Philippoz, Prangins (CH); Edmund Arthur Flexman, Jr., Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/384,605

(22) Filed: Aug. 27, 1999

(51) Int. Cl.⁷ .............................. B32B 27/36; B32B 27/42
(52) U.S. Cl. .................. 428/480; 525/419; 525/437; 525/441; 525/92 D; 525/442; 428/474.4; 428/475.2; 428/480; 428/475.5; 428/483; 428/506; 428/524; 428/412; 428/421; 428/422; 428/423.7; 428/458; 156/157; 156/242; 156/244.11
(58) Field of Search ...................................... 525/419, 437, 525/441, 92 D, 442; 428/474.4, 475.2, 480, 475.5, 483, 506, 524, 412, 421, 422, 423.7, 458; 156/157, 242, 244.11

(56) References Cited

U.S. PATENT DOCUMENTS

| | | |
|---|---|---|
| 3,821,056 | 6/1974 | Reardon . |
| 4,268,570 * | 5/1981 | Imanaka et al. . |
| 5,149,589 | 9/1992 | Naritomi . |
| 5,863,987 * | 1/1999 | Nakamura et al. . |

OTHER PUBLICATIONS

Patent Abstract of Japan, vol. 1998, No. 01, Jan. 30, 1998, JP 09 249800A.

* cited by examiner

*Primary Examiner*—Robert Dawson
*Assistant Examiner*—Kuo-Liang Peng

(57) ABSTRACT

The invention provides a composition that exhibits good adhesion to polyamide material and other materials, comprising 60 to 99 weight percent of a copolyester elastomer, and 1 to 40 weight percent of a novolac resin, based on the total weight of the copolymer elastomer and the novolac resin only, wherein the composition comprises greater than 50 weight percent copolyester elastomer based on the total weight of the composition. The invention also concerns an article comprising at least two materials bonded together at one or more defined contact surfaces, a first one of the bonded materials comprising a copolyester elastomer and a novolac resin. Such bodies can be welded, injection molded, and extruded simultaneously or sequentially.

11 Claims, No Drawings

COPOLYESTER ELASTOMER COMPOSITIONS AND FUSION BONDED ARTICLES

This invention relates to copolyester elastomer compositions, in particular copolyether ester compositions which provide an improved adhesion to polyamide and other materials when compared to the direct adhesion of copolyester elastomer to these materials, the use of these compositions and articles made thereof. As a wide range of viscosity is covered by these blend compositions, they are suitable for co-extrusion applications and for injection-molding methods like co-injection and multiple-shot molding.

BACKGROUND OF THE INVENTION

It is known that compatibility and adhesion between copolyether ester (TEEE) and polyamide (PA) is low.

Good adhesion between TEEE and PA would be desirable for co-extrusion, over-moulding and assembly by welding methods.

As a first example, plastic tubings prepared from polyamide resin are known and are used for various applications. However, single-layer polyamide tubings are not always capable of meeting all the requirements of chemical compatibility with the material flowing in them and resistance to the range of end-use temperatures and mechanical stresses. In particular, during transportation of aliphatic or aromatic solvents or fuels, they exhibit several problems, such as a lack of barrier action against the medium, dimensional instability and insufficient resistance to mechanical stresses.

Attempts have been made to solve these problems by the use of multilayer pipes comprising inner layers and/or barrier layers made of fluoropolymer (U.S. Pat. No. 5,743,304; WO 9744186; WO9409303), polyolefin (DE 3,715,251; DE 3,821,723), polyvinylalcohol (DE 3,510,395; DE 3,827,092) or combinations of these (DE 4,001,125; DE 4,001,126). Although these methods are useful for some applications, there is a need for alternatives providing a different combination of chemical resistance, temperature range, gas permeability and cost. For such co-extrusion applications, it is a further advantage to have a close match of the viscosity of the materials at processing temperature.

As a second example, both polyamides and copolyether esters have, for many years, been commonly used to form articles of all sizes and shapes. Each group of materials has its own advantages and drawbacks. More specifically, polyamides generally yield products having high rigidity and good resistance to many corrosive chemicals. In contrast, copolyester elastomers are renowned for their flexibility, resistance to fatigue, resistance to oils and hydrocarbons and soft touch characteristics. Since there are many mechanical and electrical components which comprise pluralities of functional parts, it is not surprising to note that in many cases, a combination of flexible and rigid materials is required.

Mechanical assembly methods (screw connections, snap-fitting) and adhesive joining are possible for dissimilar and incompatible materials, but they are not always acceptable for cost or performance reasons. Possible alternatives are the direct welding of separately molded parts and the special injection-molding methods like co-injection or multiple-shot molding. These methods require that the materials have a good adhesion to each other, otherwise the joining interfaces are not tight to either liquids or gases and can be separated with little force.

U.S. Pat. No. 5,149,589 recognises the problems of fusion bonding of synthetic resins such as polyamide to thermoplastic elastomers, particulary those having high rubber elasticity, namely the strength and sealing at the bond are unsatisfactory. It proposes therefore a composition of the thermoplastic elastomer with a thermoplastic polyester elastomer (TEEE) in given proportions, fusion bonded to the synthetic resin. However, such compositions have properties which are not suitable for all applications. In particular, the compositions including thermoplastic polyurethane (TPU) should not be processed at temperatures above 230° C. because of the risk of decomposition to isocyanates, which limits their use in coextrusion applications. Also, these compositions have a high fraction of thermoplastic elastomer, so that they are too soft and rubbery for some mechanical requirements.

U.S. Pat. No. 4,268,570 recognises the problems of adhering polyester block copolymers to metal and discloses a metal-coated plastic product which comprises a molded mixture of a polyester block copolymer with a copolymer comprising an acrylic monomer, butadiene and styrene, and a metallic coating, optionally with an adhesive therebetween.

SUMMARY OF THE INVENTION

The invention overcomes the aforementioned limitations of the prior art by providing a composition comprising 60 to 99 weight percent of a copolyester elastomer, and 1 to 40 weight percent of a novolac resin, said weight percents based on the total weight of the copolymer elastomer and the novolac resin only, wherein the composition comprises greater than 50 weight percent copolyester elastomer based on the total weight of the composition.

The compositions according to the invention exhibit good adhesion to polyamide material and other materials, with a range of viscosity that makes them suitable for applications in coextrusion and in various injection molding methods. Moreover, they exhibit good adhesion to polyamide material and other materials, and can be processed in a wide range of conditions in particular at temperatures above 230° C. These compositions furthermore exhibit superior adhesion to polyamide material and other materials compared to known copolyester elastomer compositions, over a wide range of processing conditions and composition ranges.

The copolyester elastomer is advantageously a copolyetherester consisting essentially of a multiplicity of recurring long chain ester units and short chain ester units joined head-to-tail through ester linkages. The long chain ester units are represented by the formula

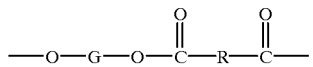

and the short-chain ester units are represented by the formula:

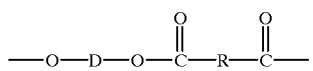

where G is a divalent radical remaining after removal of terminal hydroxyl groups from a poly(alkylene oxide) glycol having a molecular weight of about 400–6000 and a carbon-to-oxygen ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided said short chain ester units amount to about 15–95% by weight of the copolyetherester.

Alternatively, the copolyester elastomer is a copolyester ester.

Copolyetherester elastomers and copolyester ester elastomers are described or example in U.S. Pat. Nos. 4,981,908; 5,824,421 and 5,731,380, the descriptions hereof are incorporated herein by way of reference.

Polyetherester block copolymers and their preparation are also described in Encyclopedia of Polymer Science and Engineering, Volume 12, pages 76–177 (1985) and the references reported therein.

Various polyetherester block copolymers are commercially available from a number of companies under various tradenames, for example HYTREL of E.I. du Pont de Nemours, RITEFLEX of Ticona and ARNITEL of DSM.

Varying the ratio hard/soft segment and using different alkylene oxides and molar weights of the soft segments makes it possible to obtain block copolyesters having different hardnesses, for example between Shore D 30 and 80.

Depending on the desired pattern of characteristics, persons skilled in the art will be able to select the polyetherester block copolymer for the compositions according to the invention.

The polyetherester block copolymer may contain the usual additives, for example stabilizers, dyes or pigments, fillers, flame retardants, processing aids, for example release agents, etc.

The novolac resin used in the compositions according to the invention is a condensation product of phenol and formaldehyde with an average molecular weight between 400 and 5000. Novolac resins are described in the Encyclopaedia of Polymer Science and Engineering, Volume 11, pages 45–95 (1985).

Thermoplastic novolac resins are produced when a less than stoichiometric amount of formaldehyde is reacted with phenol in an acidic solution. In general, novolacs contain no hydroxymethyl groups and cannot crosslink simply by heating as in the case of resoles.

Novolac resins useful in the present invention can be approximately represented by the general polymer formula:

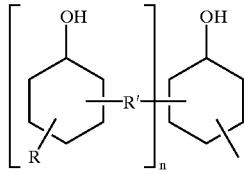

Wherein n can be an integer from 1 to 1000 and R can be hydrogen; a halogen (e.g. bromine, chlorine, fluorine, etc.); a C1 aryl group, or a C7–C20 arylalkyl radical, any of which may be subst C1–C12 alkyl group or a halogen atom; or a hydroxy aryl or alkyl hydroxy aryl radical.

And, wherein R' can be CH2 (often referred to a methylene bridge) or an organic group such as a rosin ester.

Examples of the novolac resins useful herein include, but are not limited to, phenol-formaldehyde, resorcinol-formaldehyde, p-butyl phenol-formaldehyde, p-ethyl phenol-formaldehyde, p-hexyl phenol-formaldehyde, p-propyl phenol-formaldehyde, p-pentyl phenol-formaldehyde, p-octyl phenol-formaldehyde, p-heptyl phenol-formaldehyde, p-nonlyl phenol-formaldehyde, bisphenol-A-formaldehyde, hydroxynaphthaleneformaldehyde and alkyl (such as t-butyl) phenol modified ester (such as pentaerythritol ester) of rosin (particularly partially maleated rosin). The various novolacs differ in their R substituted group, melting points, viscosities and other properties.

Particularly preferred resins include the thermoplastic phenol-formaldehyde resins such as HRJ12700 available from Schenectady International.

The preferred compositions according to the invention typically comprise from 75 to 98 weight percent of a copolyester elastomer and from 2 to 25 weight percent of a novolac resin, based on the weight of elastomer and novolac only.

The compositions according to the invention may further comprise at least one acrylate rubber, styrene-ethylene/butylene-styrene rubber, low-melting nylon or thermoplastic polyurethane in a total amount less than 50 weight percent based on the total weight of the composition, usually up to about 30 weight percent of the total, wherein the rubber and the low-melting nylon usually each make up no more than about 20 weight percent of the total.

Thermoplastic polyurethanes (TPUs) are particularly advantageous as additives, such as the TPUs described in U.S. Pat. Nos. 5,344,882 and 5,731,380. The thermoplastic polyurethanes suited for use in the compositions of the present invention can be selected from those commercially available or can be made by processes known in the art. See, for example, Rubber Technology, 2nd edition, edited by Maurice Morton (1973), Chapter 17, Urethane Elastomers, D. A. Meyer, especially pp. 453–6.

Thermoplastic polyurethanes are derived from the reaction of polyester or polyether polyols with diisocyanates and optionally also from the further reaction of such components with chain-extending agents such as low molecular weight polyols, preferably diols, or with diamines to form urea linkages. Thermoplastic polyurethanes are generally composed of soft segments, for example polyether or polyester polyols, and hard segments, usually derived from the reaction of the low molecular weight diols and diisocyanates. While a thermoplastic polyurethane with no hard segments can be used, those most useful will contain both soft and hard segments.

Processes for making TPUs are well known and include both single or multiple step polymerizations. In a single step or "one-shot" polymerization, the diisocyanate, polyol and chain extending agent are combined and reacted, whereas in a multiple step process the polyol is first reacted with the diisocyanate to produce a prepolymer which is subsequently reacted with the chain extender to build molecular weight. Such processes are disclosed, for example, in U.S. Pat. Nos. 3,493,634; 3,642,964; 4,169,196; 4,202,957; and 4,665,126.

The TPUs may contain antioxidants, lubricants, stabilizers, and other additives commonly used in conjunction with elastomeric polyurethanes. These additives may be incorporated at any appropriate stage of TPU preparation.

TPUs are commercially available, for example, from Elastogran under the trademark ELASTOLLAN, from B.F. Goodrich Company under the trademark ESTANE, and from Dow Chemical under the trademark PELLETHANE.

Rubbery polymers which can be included in the composition of the present invention include acrylate terpolymer rubbers as described in U.S. Pat. No. 5,380,785, such as those available from Goodyear Chemical under the trademark SUNIGUM, styrene-ethylenelbutylene-styrene block copolymers such as those available from Shell Chemical Company under the tradename KRATON, and methacrylate/butadiene/styrene multiphase composite interpolymers such as those available from Rohm & Haas Co under the tradename PARALOID.

Suitable low-melting nylons which can be included in the composition of the present invention include those available from E.I. du Pont de Nemours under the Trademark ELVAMIDE, usually in an amount up to 20 weight percent of the total, preferably up to about 15 weight percent.

The invention also concerns an article comprising at least two materials bonded together at one or more defined contact surfaces, a first one of the bonded materials comprising a copolyester elastomer and a novolac resin, in particular the compositions according to the invention as discussed above.

In such bonded article, the first material can be bonded to a second material comprising polyamide, polyester, polyacetal, fluoropolymer having a grafted polar functionality, polysulfone, polyphenylene oxide, polyphenylene sulfide, polycarbonate, polymethylmethacrylate, styrene-acrylonitrile, acrylonitrile-butadiene-styrene, polyetherketoneketone, or polyetherether-ketone, or metal.

The bonded article can further comprise a third material bonded at one or more defined contact surfaces to the first material, wherein the third material comprises a copolyester elastomer.

The copolyester elastomer forming the third material of this bonded article can be a block copolyetherester consisting essentially of a multiplicity of recurring long chain ester units and short chain ester units joined head-to-tail through ester linkages, as defined above, or a copolyester ester, and can include the novolac resin and additives defined above as well as have the weight proportions defined above for the composition.

In an alternative bonded article, the first material can be bonded to a metal such as aluminum, chromium, nickel, iron and its alloys, silver and gold.

A further aspect of the invention is the use of a novolac resin in a first material to bond the first material to a second material at one or more defined contact surfaces, in particular wherein the first material comprises a copolyester elastomer, and the second material comprises polyamide, polyester, polyacetal, polysulfone, polyphenylene oxide, polyphenylene sulfide, fluoropolymer having a grafted polar functionality, polycarbonate, polymethylmethacrylate, styrene-acrylonitrile, acrylonitrile-butadiene-styrene, polyetherketone-ketone, or polyetheretherketone, or a metal.

The invention also covers a method of making an article comprising a first material bonded to a second material at one or more defined contact surfaces, comprising the steps of providing a first material comprising a copolyester elastomer and a novolac resin, and bonding the first material to the second material at one or more defined contact surfaces.

The second material can be polyamide or another of the listed thermoplastic resins, or a metal.

The method according to the invention may further comprise one of the following sequences or steps: (a) forming a body from the first material, forming a body from the second material, and welding the bodies together to form an article; (b) forming one of the materials to make a preform, and injection molding the other material over the preform to form an article; (c) forming one of the materials to make a preform, and extruding the other material over the preform to form an article; (d) simultaneously forming the first material and the second material by extrusion or injection molding to form an article; (e) sequentially extruding the first material and the second material to form an article; or (f) forming the first material to make a preform, and coating the second material, in particular a metal, onto the preform.

When the second material is a metal, such as aluminum, chromium, nickel, iron and its alloys, silver and gold, the metal can be coated on a preform of the first material by conventional methods such as sputtering, vacuum metallizing, stamping, laminating, or chemical or electrical plating, or combinations thereof, all combined with appropriate heat treatments.

DETAILED DESCRIPTION

The invention will be further described and compared to prior art practices in the following Examples. The examples are not, however, intended to limit the invention in any way. The tests hereinafter described were performed on samples obtained from compositions prepared in accordance with the Examples. Unless otherwise indicated, all parts and percentages are by weight based on total composition weight.

The melt flow rate was measured according to ISO 1133, at 230° C. with a 2.16 kg load. The tensile properties were measured at 200 mm/min pulling speed, using ISO 5A specimen died from 2 mm thick injection-molded plaques; for these compositions, the stress-strain behaviour is characterised by the values of stress at yield, strain at yield, stress at break and elongation at break. The glass transition temperature was measured as the maximum of the tangent delta signal in the dynamic mechanical analysis (DMA).

Materials used in the Examples set forth below are as follows, identified by the respective trademarks and trade designations:

TEEE 1: HYTREL 5586, a thermoplastic polyester elastomer from E.I. du Pont de Nemours having a Shore D Hardness of 55 and a melt flow rate of 4.5 g/10 min at 220° C. under 2.16 kg load.

TEEE 2: HYTREL 5556, a thermoplastic polyester elastomer from E.I. du Pont de Nemours having a Shore D Hardness of 55 and a melt flow rate of 7.5 g/10 min at 220° C. under 2.16 kg load.

TEEE 3: HYTREL HTR8163 HV BK, a thermoplastic polyester elastomer from E.I. du Pont de Nemours having a Shore D Hardness of 67 and a melt flow rate of 5 g/10 min at 230° C. under 2.16 kg load.

Novolac: HRJ 12700, a phenol-formaldehyde condensation product from Schenectady International.

TPU: ELASTOLLAN 1174D, a thermoplastic polyurethane elastomer from Elastogran GmbH, having a Shore D hardness of 73.

Rubber 1: SUNIGUM P7395, an acrylate terpolymer from Goodyear Chemical, having a Shore A hardness of 53.

Rubber 2: PARALOID EXL 6600, a methacrylate/butadiene/styrene multiphase composite interpolymer from Rohm & Haas Co.

Rubber 3: KRATON G 1651, a styrene-ethylene-butylene-styrene block copolymer from Shell Chemical Company, having a Shore A hardness of 76.

Nylon 1: ELVAMIDE 8061, a nylon 6, 6/6, 6/10 terpolymer from E.I. du Pont de Nemours, having a melting temperature of 156° C.

Nylon 2: ZYTEL ST811 HS, a super-tough nylon 6 resin from E.I. du Pont de Nemours, having a melting temperature of 215° C.

Nylon/ETFE blend: a blend consisting of 80% ZYTEL 42A, which is a high viscosity nylon 66 from E.I. du Pont de Nemours, and 20% TEFZEL ETFE, which is a melt-extrudable fluoropolymer from E.I. du Pont de Nemours.

EXAMPLES

Examples 1 to 11 (Table 1) illustrate the invention; C1 to C21 (Table 2) are Comparative Examples.

The compositions shown in Tables 1 and 2 were prepared by mixing the components in the described proportions and melt blending the resulting mixtures on a 40 mm diameter twin screw extruder. Extrusion conditions were as follows: temperature profile of the extruder: decreasing from 230° C. at the hopper to 200° at the die; die temperature: 200° C; screw speed: 300 rpm. Measured melt temperatures range from 210° C. to 245° C. for the various compositions.

When possible, the extrudate was pulled into strands, cooled in a water bath and pelletized. Table 1 shows that this was the case for all compositions according to the invention, whereas Table 2 shows that for Comparative Examples C19 to C21 the strands showed very high swelling and tendency to break at the die of the extruder.

The melt flow rate (in g/10 min at 230° C., 2.16 kg) of Examples 1–11 and Comparative Examples C1–C18 was measured after drying the pellets for 2 hours at 100° C. The values obtained are reported in Tables 1 and 2.

TABLE 1

|  | Examples 1 to 11 | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| TEEE 1 | 98 | 95 | 90 | 85 | 75 | 60 | 75 | 75 | 75 | 75 | 75 |
| Novolac | 2 | 5 | 10 | 15 | 25 | 40 | 10 | 10 | 10 | 10 | 10 |
| Nylon 1 |  |  |  |  |  |  | 15 |  |  |  |  |
| TPU |  |  |  |  |  |  |  | 15 |  |  |  |
| Rubber 1 |  |  |  |  |  |  |  |  | 15 |  |  |
| Rubber 2 |  |  |  |  |  |  |  |  |  | 15 |  |
| Rubber 3 |  |  |  |  |  |  |  |  |  |  | 15 |
| MFR | 5.8 | 6.3 | 7.9 | 9.4 | 12 | 27 | 6.3 | 5.4 | 10 | 8.1 | 10 |
| Weld Strength | 1.34 | 1.44 | 1.49 | 1.59 | 1.77 | (a) | 1.22 | 1.50 | 1.30 | (a) | (a) |

Note "(a)": The composition showed strong sticking in the mold

The pellets were dried and injection-molded into 2 mm thick plaques. Molding conditions were as follows: melt temperature 230° C., mold temperature 45° C., hold pressure 70 MPa, total cycle time 40 to 60 seconds. The compositions of Examples 6, 10 and 11 showed strong sticking in the mold during this process. This indicates strong adhesion to metals, making these Examples useful with other processing methods.

The thus-prepared molded plaques were welded edge to edge to molded plaques of the nylon 2 using the hot mirror method with the following conditions: hot mirror at 600° C.; samples placed at 2 mm from the mirror for a radiative heating; heating times: 40 seconds for Examples and Comparative Examples, 60 seconds for the nylon 2; plaques pushed edge against edge by hand during 10 seconds.

TABLE 2

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| TEEE 1 | 100 | | | | | | | | | | | | | | | | | | | | |
| TEEE 2 | | 100 | 90 | 80 | 70 | 60 | 90 | 80 | 70 | 60 | 90 | 80 | 70 | 60 | 50 | 70 | 50 | 40 | 50 | 40 | |
| Novolac | | | | | | | | | | | | | | | | | | | | | 40 |
| Nylon 1 | | | | | 10 | 20 | | | 10 | 20 | | | 10 | 20 | | | 10 | 20 | | | |
| TPU | | | 10 | 20 | 20 | 20 | | | | | | | | | 50 | 30 | 40 | 40 | 50 | 30 | 30 |
| Rubber 1 | | | | | | | 10 | 20 | 20 | 20 | | | | | | | | | | | |
| Rubber 2 | | | | | | | | | | | 10 | 20 | 20 | 20 | | | | | | | |
| Rubber 3 | | | | | | | | | | | | | | | | | | | | 30 | 30 |
| MFR (230° C., 2.16 kg)[g/10 min] | 6.4 | 9.5 | 8.7 | 4.3 | 2.4 | 7 | 5.6 | 1.7 | 1 | 1.6 | 8.1 | 4.7 | 3.9 | 12 | 26 | 13 | 20 | 25 | (b) | (b) | (b) |
| Weld Strength on nylon 2[kN] | | 0.14 | 0.88 | 0.40 | 0.93 | 1.19 | 0.95 | 0.79 | 1.00 | 1.30 | 0.67 | 0.85 | 0.68 | 1.28 | 1.06 | 1.53 | 1.29 | 0.66 | | | |

Note "(b)": The composition could not be pelletized because the strands showed very high swelling and tendency to break at the die of the extruder.

The weld strength on the nylon 2 was defined as the force in kN required to separate these two welded plaques, using a tensile machine at 100 mm/min pulling speed. The measured values of the weld strength are shown in Tables 1 and 2.

It can be seen from Tables 1 and 2 that the compositions according to the invention show improved weld strength over the Comparative Examples. This is in addition to their range of viscosity which makes them suitable for processing by injection molding and extrusion methods.

The glass transition temperature and the tensile properties were measured for several compositions of Examples 1 to 8. The results are shown in Table 3. In the binary blends of TEEE and novolac, the glass transition temperature increases with the fraction of novolac; at equal content of novolac, the glass transition temperature is also influenced by the presence of a third component. In all these examples, both the glass transition temperatures and the tensile properties remain well within the range characteristic for thermoplastic polyester elastomers.

TABLE 3

|  | Examples 1 to 8 |  |  |  |  |  |  |  |
| --- | --- | --- | --- | --- | --- | --- | --- | --- |
|  | 1 | 2 | 3 | 4 | 5 | 6 | 7 | 8 |
| TEEE 1 | 98 | 95 | 90 | 85 | 75 | 60 | 75 | 75 |
| Novolac | 2 | 5 | 10 | 15 | 25 | 40 | 10 | 10 |
| Nylon 1 |  |  |  |  |  |  | 15 |  |
| TPU |  |  |  |  |  |  |  | 15 |
| Stress at yield (MPa) | 14.1 | 13.9 | 13.6 | 13.5 | 17.4 | 25.1 | 23.2 | 18 |
| Strain at yield (%) | 31 | 36 | 37 | 39 | 21 | 5 | 15 | 26 |
| Stress at break (MPa) | 24 | 23 | 21 | 28 | 34 | 38 | 29 | 29 |
| Strain at break (%) | 368 | 381 | 370 | 469 | 408 | 358 | 328 | 411 |
| Glass transition temp. ° C. | −15.5 | −9.2 |  | 14.8 | 35.4 |  | −25.8 | −6.8 |

Examples 12 and 13 and Comparative Example 22

Three-layer tubings were extruded, wherein the compositions of the inner, middle and outer layers are as described in Table 4, the middle layer in Examples 12 and 13 being a composition according to the invention.

TABLE 4

|  | Example 12 | Example 13 | C22 |
| --- | --- | --- | --- |
| Inner layer | nylon EFTE blend | nylon EFTE blend | nylon EFTE blend |
| Middle layer | 80% TEEE 1 + 20% novolac | 90% TEEE 1 + 10% novolac | 85% TEEE 1 + 15% rubber 1 |
| Outer layer | TEEE 3 | TEEE 3 | TEEE 3 |

After extrusion, small strips were cut from the tubings, and the adhesion of the layers was tested. The layers could not be separated with a knife, nor with torsion of the strips. In a tensile test carried out on the strips at 50 mm/min pulling speed, no delamination of the various layers was observed during the test, the three layers broke together at an elongation above 100%, and in the broken pieces the layers still could not be separated from each other.

With the comparative examples 22, the adhesion between the inner and middle layers was poor, and they could be separated easily with the nail.

What is claimed is:

1. An article comprising at least two materials bonded together at one or more defined contact surfaces, a first one of the bonded materials comprising a copolyester elastomer and a novolac resin, wherein the first bonded material comprises 60 to 99 weight percent of a copolyester elastomer, and 1 to 40 weight percent of a novolac resin, said weight percents based on the total weight of copolyester elastomer and novolac resin only.

2. The article of claim 1, wherein a second one of the bonded materials comprises polyamide, polyester, polyacetal, polysulfone, polyphenylene oxide, polyphenylene sulfide, fluoropolymer having a grafted polar functionality, polycarbonate, polymethylmethacrylate, styrene-acrylonitrile, acrylonitrile-butadiene-styrene, polyetherketoneketone, polyetherether-ketone or metal.

3. The article of claim 2, further comprising a third material bonded at one or more defined contact surfaces to the first material, wherein the third material comprises a copolyester elastomer.

4. The article of claim 1, wherein the copolyester elastomer of the third material is a copolyetherester consisting essentially of a multiplicity of recurring long chain ester units and short chain ester units joined head-to-tail through ester linkages, said long chain ester units being represented by the formula

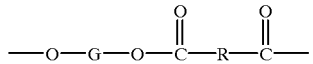

and the short-chain ester units are represented by the formula:

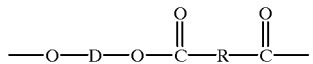

where G is a divalent radical remaining after removal of terminal hydroxyl groups from a poly(alkylene oxide) glycol having a molecular weight of about 400–6000 and a carbon-to-oxygen ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided said short chain ester units amount to about 15–95% by weight of said copolyetherester.

5. The article of claim 1, wherein the copolyester elastomer is a copolyester ester.

6. The article of claim 1, wherein the novolac resin is a condensation product of phenol and formaldehyde with an average molecular weight between 400 and 5000.

7. The article of claim 1, wherein the first material comprises from 75 to 98 weight percent of a copolyester elastomer and from 2 to 25 weight percent of a novolac resin, based on the total weight of copolymer elastomer and novolac resin only.

8. The article of claim 1, wherein the first material further comprises at least one acrylate rubber, styrene-ethylene/butylene-styrene rubber, low-melting nylon or thermoplastic polyurethane in a total amount less than 50 weight percent based on the total weight of the composition.

9. A method of making an article comprising a first material bonded to a second material at one or more defined contact surfaces, comprising the steps of providing a first material comprising a copolyester elastomer and a novolac resin, and bonding the first material to the second material at one or more defined contact surfaces.

10. The method of claim 9, wherein the second material comprises polyamide, polyester, polyacetal, polysulfone, polyphenylene oxide, polyphenylene sulfide, polycarbonate, fluoropolymer having a grafted polar functionality, polymethylmethacrylate, styrene-acrylonitrile, acrylonitrile-butadiene-styrene, polyetherketoneketone, polyetheretherketone or metal.

11. The method of claim 10, further comprising one of the following sequences or steps:
   (a) forming a body from the first material, forming a body from the second material, and welding the bodies together to form an article;
   (b) forming one of the materials to make a preform, and injection molding the other material over the preform to form an article;
   (c) forming one of the materials to make a preform, and extruding the other material over the preform to form an article;
   (d) simultaneously forming the first material and the second material by extrusion or injection molding to form an article;
   (e) sequentially extruding the first material and the second material to form an article; or
   (f) forming the first material to make a preform, and coating the second material, a metal, onto the preform.

* * * * *

UNITED STATES PATENT AND TRADEMARK OFFICE
CERTIFICATE OF CORRECTION

| | | |
|---|---|---|
| PATENT NO. | : 6,312,824 B1 | Page 1 of 1 |
| DATED | : November 6, 2001 | |
| INVENTOR(S) | : Jean-Michel Philippoz and Edmund Arthur Flexman, Jr. | |

It is certified that error appears in the above-identified patent and that said Letters Patent is hereby corrected as shown below:

<u>Column 3,</u>
Line 12, change "IITREL" to read -- HYTREL --

Signed and Sealed this

Seventeenth Day of September, 2002

Attest:

Attesting Officer

JAMES E. ROGAN
*Director of the United States Patent and Trademark Office*